United States Patent [19]

Jacobson et al.

[11] Patent Number: 4,858,475
[45] Date of Patent: Aug. 22, 1989

[54] APPARATUS AND METHOD FOR MEASURING STRAIN

[75] Inventors: Walter E. Jacobson, Meriden; Donald J. Summers, Northford; Kenneth Vining, Branford; Frederick E. Jackson, Wethersfield, all of Conn.

[73] Assignee: Revere Corporation of America, Wallingford, Conn.

[21] Appl. No.: 54,021

[22] Filed: May 26, 1987

[51] Int. Cl.⁴ .......................... G01L 1/22; G01L 5/13
[52] U.S. Cl. ............................ 73/862.54; 73/862.57; 73/862.66
[58] Field of Search ............... 73/768, 862.54, 862.56, 73/862.65, 862.66, 862.57

[56] References Cited

U.S. PATENT DOCUMENTS

| 3,330,154 | 7/1967 | Habern et al. | 73/862.54 |
| 3,695,096 | 10/1972 | Kutsay | 73/862.66 X |
| 4,280,363 | 7/1981 | Johansson | 73/768 |
| 4,478,091 | 1/1984 | Forrester | 73/862.54 |
| 4,530,245 | 7/1985 | Jacobson | 73/768 |
| 4,576,053 | 3/1986 | Hatamura | 73/862.66 |

FOREIGN PATENT DOCUMENTS

2450780  5/1976  Fed. Rep. of Germany ... 73/862.65

Primary Examiner—Charles A. Ruehl
Attorney, Agent, or Firm—Cooper & Dunham

[57] ABSTRACT

Apparatus and method for measuring strain on a pin with one or more strain gage elements disposed within an open-ended axial bore formed in the pin, wherein the strain gage element or elements is or are mounted on a plug that is inserted into the bore with an interference fit.

11 Claims, 5 Drawing Sheets

APPARATUS AND METHOD FOR MEASURING STRAIN

BACKGROUND OF THE INVENTION

This invention relates to apparatus and methods for measuring strain produced by forces acting on a body or member. More particularly, it relates to such apparatus and methods capable of utilizing individually conventional strain gage elements, for example to enable measurement of a force to which the body or member is subjected. In a still more particular sense, it concerns the making of such measurements in a member which is axially elongated and generally radially symmetrical in transverse cross-section, viz. a member having the general configuration of a rod or shaft, such member being herein termed a pin.

A typical strain gage element includes an array of runs of wire electrically connected in a suitable circuit (ordinarily, a Wheatstone bridge circuit) and mechanically connected to a body or member in a predetermined orientation relative thereto such that strain applied to the body or member stresses (and thereby alters the electrical resistance of) the wire. Frequently a plurality of strain gage elements in a common bridge circuit are mechanically connected to the body or member, with respectively different orientations. Since the variation in resistance of a strain gage element is proportional to the applied strain, the voltage output of the bridge circuit can be read as a measure of the forces (acting on the body or member) that produce the detected strain. Shear, torsion, bending, tension and compression strains can all be selectively measured in this way, depending on the location and orientation of the strain gage element or elements relative to the body or member. Methods and apparatus employing strain gage elements for these purposes are described, for example, in U.S. Pat. No. 4,530,245.

In one important particular aspect, to which detailed reference will be made herein by way of specific illustration, the present invention is directed to the measurement of shear strain in a shear pin, e.g. as employed in a tongue-and-clevis coupling between a tractor and a plough. Measurement of drag force on a tractor, by detection of shear strain on the pin, has recognized utility for control of ploughing operations. Heretofore it has been known to provide a shear pin with an axial bore extending at least part way along the length of the pin, and to bond strain gage elements to the inner wall of the bore at a location at which they will sense the strain produced by shear when the pin is subjected to forces resulting in shear. The difficulty of properly positioning and mounting the strain gage elements within the bore, however, precludes mass production of shear pins equipped with strain gage elements and causes such pins to be undesirably high in cost.

SUMMARY OF THE INVENTION

The present invention in a first aspect broadly contemplates the provision of apparatus for measuring strain in a structure, including, in combination, a pin adapted to constitute an element of the structure and to be subjected to the strain to be measured, the pin having an axial bore opening through one end of the pin, and one or more strain gage elements, wherein the improvement comprises a plug for mounting the strain gage element or elements within the bore, the plug being inserted endwise into the bore with an interference fit and having a surface portion or portions, on which the strain gage element or elements is or are mounted, shaped and disposed to enable the strain gage element or elements to enter the bore with clearance when the plug is introduced into the bore.

In exemplary or preferred embodiments, each of the aforementioned surface portions is a flat side surface of the plug. Thus, the plug may have two opposed, parallel flat side surfaces with least one strain gage element mounted each of these flat side surfaces. It will be understood that the term "flat side surface" refers to a generally planar surface which is substantially parallel to the axis of the bore when the plug is received in the bore.

As further features of preference or advantage, in many instances, the apparatus includes at least four strain gage elements, of which at least two are mounted on each of the flat side surfaces of the plug; the bore is generally cylindrical, the plug having the shape of a cylinder with opposite side portions cut away to provide the flat side surfaces such that there are opposed arcuate side surface portions between the flat side surfaces; the maximum diameter between these opposed arcuate side surface portions before insertion of the plug in the bore is greater than that of the bore in the region of the bore at which the plug is disposed after insertion; and each of the arcuate side surface portions is formed with multiple longitudinal grooves to enable insertion of the plug in the bore with an interference fit as aforesaid.

In various modified embodiments, the plug is formed with an axial through bore, or with one or more transverse bores extending between the flat side surfaces, to amplify the strain sensed by the strain gage elements. Certain embodiments include four strain gage elements mounted on each of the two flat side surfaces and four of the transverse bores. Other (i.e. noncylindrical) cross-sectional configurations of bore and plug providing an interference fit may be used, such as a bore of rectangular cross section with a rectangular or I-shaped plug cross section. Again, with a cylindrical bore, a plug having enlarged knurled or grooved cylindrical ends with a central portion of rectangular cross section may be employed.

It is found that the apparatus of the invention provides highly effective measurement of shear strain in a shear pin of a tongue-and-clevis coupling, for example, with appropriate selection of pin bore depth, pin and plug position and angular orientation about the bore axis, and orientation of the strain gage wires relative to the pin geometry. Either one strain-gage-element bearing plug, or a pair of symmetrically disposed plugs (for greater precision of measurement, where desired) may be employed. The interference fit between the plug and pin bore affords efficient strain transfer from the pin to the plug and thence to the strain gage elements. An important advantage of the invention resides in the facility with which strain gage elements may be thus positioned in the pin bore, as compared to the prior practice of mounting the elements on the bore wall. Manufacturing costs of pins having strain-measuring capability are thereby significantly reduced.

The invention may also be used to measure strain due to forces other than shear, for example tension or compression strain (as well as torsion or bending strain) by appropriate orientation of the strain gage elements on the plug.

In a second aspect, the invention embraces the provision of a method for measuring strain in a pin, including inserting, into an open-ended axial bore formed in the pin, a plug dimensioned to be received with interference fit in the bore and bearing one or more strain gage elements on a surface portion or portions of the plug arranged to permit the strain gage elements to pass with clearance into the bore when the plug is inserted; connecting the strain gage elements to provide a voltage output representative of sensed strain; subjecting the pin to a strain-producing force; and detecting the output as a measure of the resultant strain.

Further features and advantages of the invention will be apparent from the detailed description hereinbelow set forth, together with the accompanying drawings.

BRIEF DESCRIPTION OF THE DRAWINGS

FIG. 20 is a top plan view of yet another plug suitable for use in an embodiment of the invention;

DETAILED DESCRIPTION

Referring first to FIGS. 1-7, the invention will be described as embodied in apparatus for measuring shear strain in a tongue-and-clevis coupling or hitch connecting a tractor (not shown) and a plough (not shown) dragged by the tractor. This coupling includes a tongue 10 and a clevis 11 pivotally interconnected in conventional manner by a generally cylindrical shear pin 12 which is oriented with its axis extending horizontally in a direction perpendicular to the direction (indicated by arrow F1) in which the tractor draws the plough. The tongue 10, clevis 11, and pin 12 are are typically fabricated of steel of suitable properties. The tongue-and-clevis coupling transmits drag force acting between the plough and tractor; as is known, measurement of the drag force is a useful referent for control of ploughing conditions. When the tractor draws the plough, the pin 12 is subjected to shear forces, which apply shear strain to the pin; the desired measurement of drag force can be obtained by measuring this shear strain.

Figure 1:
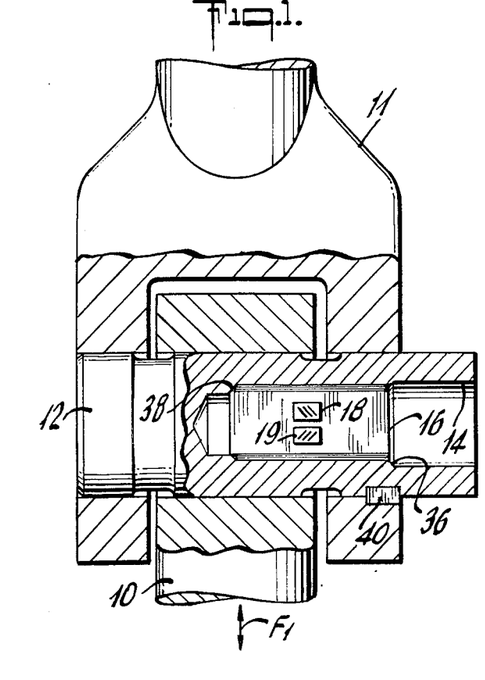
FIG. 1 is a fragmentary top plan view, partly in section, of a tongue-and-clevis coupling for a tractor and plough, incorporating an illustrative embodiment of the apparatus of the invention.

The shear pin 12 has a cylindrical axial bore 14 machined therein to a predetermined depth from the right-hand end of the pin (as seen in FIG. 1), through which the bore opens. Specifically, the bore extends inwardly from the latter end of the pin to and through a region of the pin that undergoes strain when the pin is subjected to shear as described above. Heretofore, it has been known to mount appropriately oriented strain gage elements within such a bore, at a location at which they will sense shear strain, for the purpose of measuring shear strain on the pin, the strain gage elements being bonded to the inner wall of the bore.

In accordance with the present invention, however, in the embodiment of shear strain measuring apparatus shown in FIG. 1, the strain gage elements are mounted on a plug 16 which is inserted endwise into the bore 14. Specifically, four strain gage elements, e.g. of conventional character and respectively designated 18, 19, 20 and 21, are mounted on this plug, with their wires oriented to sense shear strain when the plug is positioned as illustrated. In the drawing (FIGS. 1, 3 and 4), the strain gage elements are represented schematically and marked with parallel lines indicating the respective orientations of their wires.

The plug 16, in the embodiment of FIGS. 1-7, is a solid cylindrical stainless steel body having opposed relieved sides. That is to say, the cylindrical shape of the plug is cut away on each of two sides to form two opposite, parallel flat side surfaces 24 and 26 (these being respectively top and bottom surfaces, with the plug orientation shown in FIG. 1) each extending for the full axial length of the plug. The remaining lateral surface portions of the plug, at 28 and 30, retain their original cylindrical configuration and are opposed to each other. Two of the strain gage elements (18 and 19) are bonded to the top flat side surface 24, at a central location therein, and the other two strain gage elements (20 and 21) are bonded to the bottom flat side surface 26 at a corresponding central location.

The outer diameter of the plug measured between the opposed arcuate lateral surface portions 28 and 30 is slightly greater than the inner diameter of the portion of the bore 14 in which the plug is ultimately received, thereby providing an interference fit between the plug and the bore wall. To enable insertion of the plug into the bore, the arcuate surface portions 28 and 30 are both formed with a multiplicity of longitudinal parallel grooves 32, with the peaks 34 between grooves machined to flats. This grooving or knurling of the arcuate surface portions of the plug permits sufficient plastic flow, when the plug is forced into the bore 14, for full insertion of the plug into the position shown in FIG. 1, notwithstanding that the outer diameter of the plug between surface portions 28 and 30 is greater than the inner diameter of the cylindrical bore wall at that location. The resultant interference fit of the plug within the bore both fixes the angular orientation of the plug within the bore and provides efficient strain transfer from the pin 12 to the plug body on which the strain gage elements are mounted, so that shear strain applied to the pin 12 is sensed by the strain gage elements 18, 19, 20 and 21.

Figure 2:
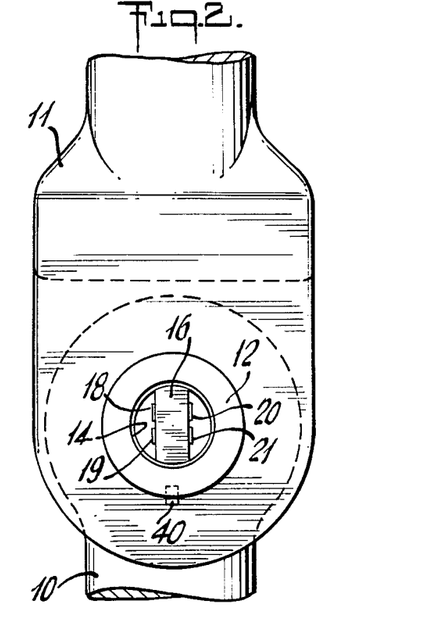
FIG. 2 is a side elevational view of the structure shown in FIG. 1.
Figure 3:
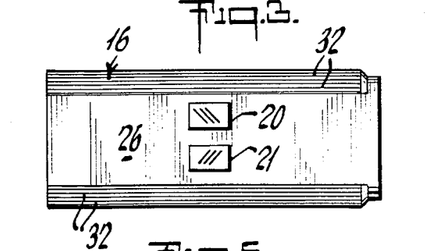
FIG. 3 is a bottom plan view of the plug, bearing the strain gage elements, in the apparatus of FIG. 1.
Figure 4:
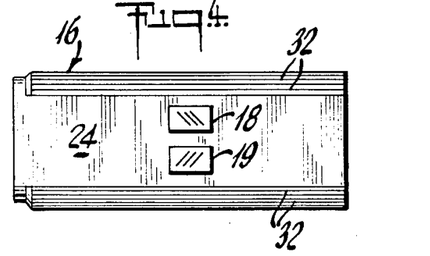
FIG. 4 is a top plan view of the plug.
Figure 5:
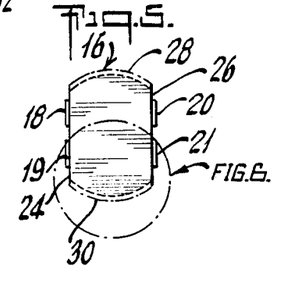
FIG. 5 is an end elevational view of the plug.
Figure 6:
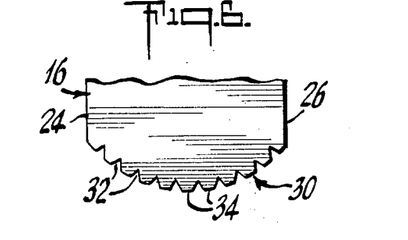
FIG. 6 is an enlarged fragmentary detailed view of the plug in end elevation, illustrating the portion of the plug generally indicated by the circle marked "FIG. 6" in FIG. 5.
Figure 7:
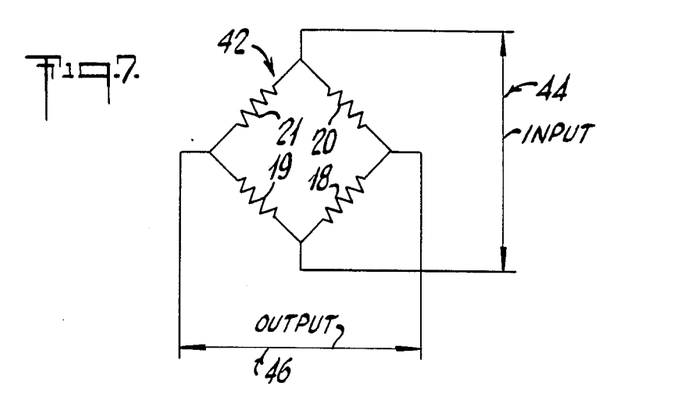
FIG. 7 is a diagram of the bridge circuit in which the strain gage elements of the apparatus of FIG. 1 are connected.

The flat side surfaces 24 and 26 of the plug are (as best seen in FIG. 2) spaced away from the facing portions of the bore inner wall, when the plug is inserted in the bore as described. This spacing accommodates the strain gage elements mounted on the plug; i.e., owing to the shape and disposition of the plug surfaces 24 and 26, the strain gage elements bonded thereto are carried into the bore with clearance when the plug is inserted into the bore.

As shown in FIG. 1, the bore 14 is stepped inwardly at 36 and again at 38. The inner step provides a seat or stop which the inner end of the plug abuts to arrest inward advance of the plug along the bore, for assured proper positioning of the plug. The outer step provides an enlarged entry portion of the bore (relative to the bore portion into which the plug is interference fitted to facilitate driving the plug inwardly.

The angular position of the shear pin 12 relative to the clevis 11 is fixed by means of a rectangular key 40 which engages facing slots or notches in the pin and clevis. In this way, and with the illustrated angular position of the plug 16 in the bore 14 set as the plug is driven into the bore, the strain gage elements 18, 19, 20 and 21 are fixedly located at an angular position for maximum output with a given strain load.

The four strain gage elements are connected (by wires, not shown, in FIG. 1) in a Wheatstone bridge circuit 42 (FIG. 7) having a suitable input potential applied as indicated at 44. In the absence of shear strain on the pin 12, the bridge is balanced; but when the pin is subjected to shear strain, the change in resistance of the individual strain gage elements unbalances the bridge to produce, at the output terminals 46, a voltage which is directly proportional to the load applied to the pin. This output may be read in any suitable and e.g. conventional manner to provide the desired measurement of forces acting on the pin.

Figures 8, 9:
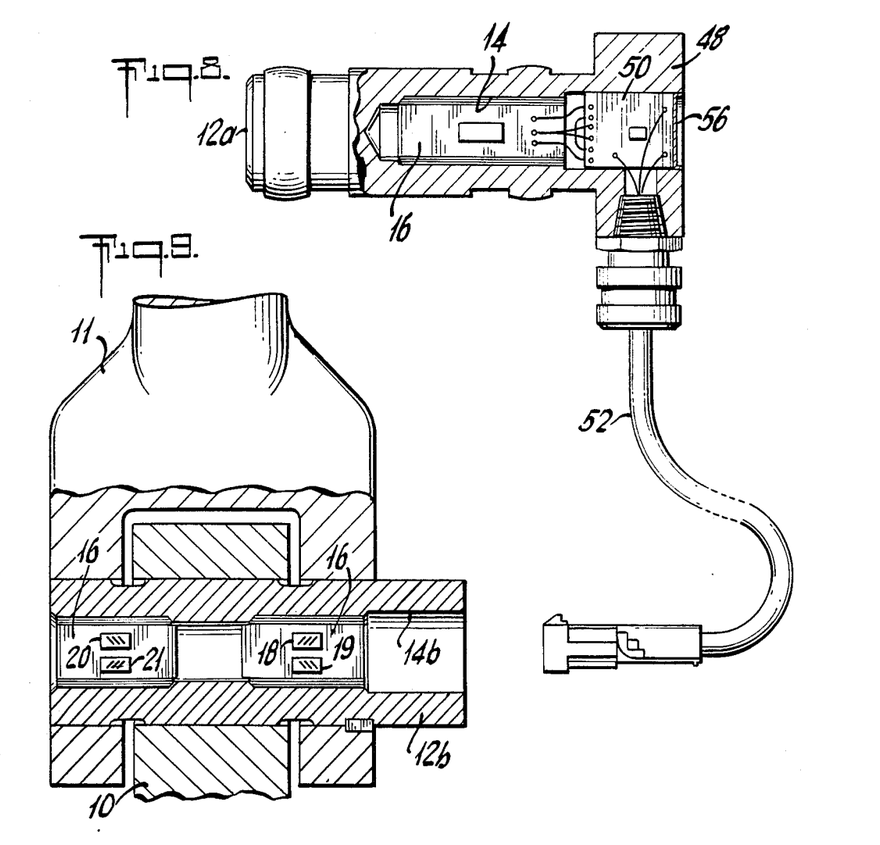
FIG. 8 is a top plan view, partly in section, of a modified pin structure for the coupling of FIG. 1, again incorporating an embodiment of the apparatus of the invention generally similar to that of FIG. 1.
FIG. 9 is a view similar to FIG. 1 illustrating an alternative embodiment of the invention.
Figure 10:
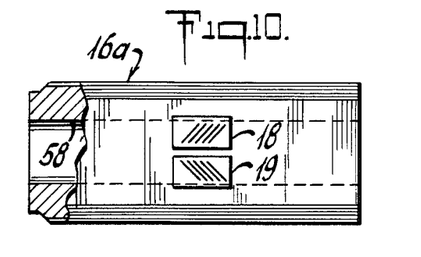
FIG. 10 is a top plan view of a modified form of plug usable in the apparatus of FIG. 1.
Figure 11:
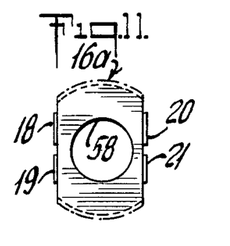
FIG. 11 is an end elevational view of the plug of FIG. 10.
Figure 12:
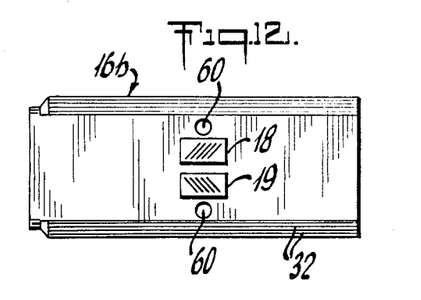
FIG. 12 is a top plan view of another modified form of plug suitable for use in the apparatus of FIG. 1.
Figure 13:
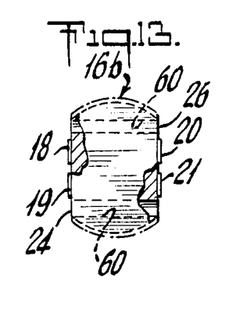
FIG. 13 is an end elevational view, partly broken away, of the plug of FIG. 12.
Figure 14:
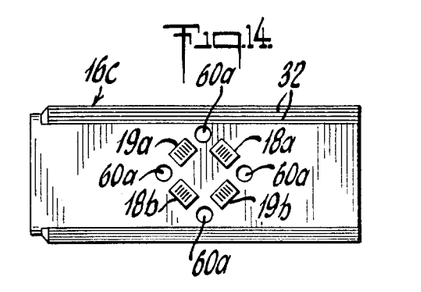
FIG. 14 is a top plan view of still another form of plug suitable for use in the apparatus of FIG. 1.
Figure 15:
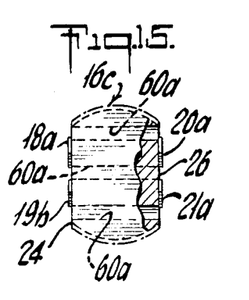
FIG. 15 is an end elevational view, partly broken away, of the plug of FIG. 14.

One illustrative arrangement for deriving the output signal from the strain gage elements is illustrated in FIG. 8. The pin 12a there shown is generally similar to the pin 12 of FIG. 1 and may be employed, in place of the latter pin, in the tongue-and-clevis assembly of FIG. 1. In FIG. 8, the pin has an enlarged end portion 48 through which the axial bore 14a extends, providing a chamber that houses a circuit board 50 with amplifying or other signal-conditioning circuitry. Leads from the board extend inwardly to the strain gage elements on the plug 16 and outwardly through a cable 52 to a plug 54 for connection to a suitable readout device. The open end of the bore 14a may be sealed with a cap 56, e.g. welded in place. Also, the connection between the cable 52 and the pin head 48 may be arranged to provide hermetic sealing.

The manufacture of the device of FIGS. 1–7 may now be readily explained. The bore 14 in the pin 12 is machined to appropriately close tolerances, and the plug 16 is similarly shaped, knurled and machined to tolerances ensuring the desired interference fit. The strain gages 18, 19, 20 and 21 are then bonded to the flat surfaces of the plug, in positions to respond to the principal strains of shear, and wired into a Wheatstone bridge configuration. Thereafter, the plug bearing the strain gage elements is inserted endwise into the bore of the pin and pressed (by application of appropriate axially directed force, in any suitable manner, to the outer end of the plug) into the location illustrated in FIG. 1, at which its inner end abuts the stop shoulder 38 of the bore, and at which it is held fixed in position by interference fit within the bore. At this location of the plug, the strain gages are disposed in the shear area of the pin. The angular orientation of the plug as thus inserted is selected with reference to the slot for key 40 so as to provide the angular orientation (relative to the clevis) represented in FIGS. 1 and 2. Finally, the pin, already containing the plug with its strain gage elements, is inserted into the tongue-and-clevis assembly and locked in place by means of the key 40.

By way of example, for use with a typical tongueand-clevis shear pin, the plug 16 may be a stainless steel body having an axial length of 1.88±0.01 inches, a maximum diameter of 0.755–0.757 inch (i.e., between arcuate surfaces 28 and 30, after knurling to a diameter of 0.761 inch and machining to produce the flats 34), and a minimum traverse dimension of 0.474–0.484 inch between flat side surfaces 24 and 26. The ribs of the knurling extend to the outer end of the plug; at the inner end, they taper abruptly inward at 60°±2° to meet smooth arcuate surface portions of a short reduced-diameter (0.746–0.748 inch) inner end portion of the plug, thereby to constitute a plug nose shaped for insertion into the bore 14 and for abutment against the seat 38.

As will be appreciated, the apparatus of the invention affords important advantages with respect to ease and cost of assembly of a shear pin having strain gage elements positioned to detect shear strain. It is much easier to premount strain gage elements on a plug and then to insert the plug into the pin bore 14 than it is to mount and appropriately locate strain gage elements on the inner wall of the bore, at a considerable distance from the open bore end, as has heretofore been necessary. Consequently, there is a very significant reduction in cost of production of shear pins incorporating apparatus for detecting shear or other strain.

In the modified embodiment shown in FIG. 9, the assembly of tongue 10 and clevis 11 is held together by a shear pin 12b having a cylindrical axial bore 14b extending throughout its entire length and opening at each end of the pin. Two of the plugs 16 are inserted endwise into the bore 14b, from opposite ends thereof, and held in the bore by interference fit as described above. Each plug bears four strain gage elements 18, 19, 20 and 21 (two on each flat surface) having wires oriented to detect shear strain transferred from the pin 12b to the plugs 16 by virtue of the interference fit, all eight of these strain gage elements being thus located in shear areas of the pin. The eight strain gage elements are electrically interconnected to form one complete Wheatstone bridge. Such an arrangement, employing two sets of four strain gage elements symmetrically disposed with respect to the grooves, may be preferred when particularly high precision of measurement is desired.

FIGS. 10-15 illustrate various modified forms of plugs suitable for use, in place of the plug 16, in the pin 12 or 12a or 12b, i.e. for measurement of shear strain, in apparatus as shown in FIGS. 1-9. Thus, the plug 16 may be replaced with a plug 16a (FIGS. 10 and 11) having an axial through bore 58, or with a plug 16b (FIGS. 12 and 13) having two transverse bores 60 extending between the flat side surfaces 24 and 26 on opposite sides of the strain gage elements 18, 19 and 20, 21. These bores serve to amplify the shear strain sensed by the strain gage elements. Again, a plug 16c (FIGS. 14 and 15) may be used in which a total of eight strain gage elements (18a, 18b, 19a, 19b, 20a, 21a, etc.) are mounted (four on on each flat side surface), with four strain-amplifying transverse bores 60a provided in the arrangement shown. In each of these plugs of FIGS. 10-15, the strain gage elements are oriented to sense shear strain, and the opposed arcuate side surface portions 28 and 30 of the plug are formed with longitudinal grooves 32 to enable endwise insertion of the plug into the pin bore 14 or 14a or 14b with an interference fit.

Alternative configurations for achieving an interference fit may also be employed. For example, knurling (longitudinal grooves) may be provided on the inner wall of the pin bore 14 in place of, or in addition to, the illustrated knurling or grooving provided on the arcuate side surfaces of the plug. Again, instead of knurling or grooving, an interference fit between the plug and pin bore may also be achieved with shrink fits, taper fits, or metal fusion by a method such as laser welding.

Figure 16:
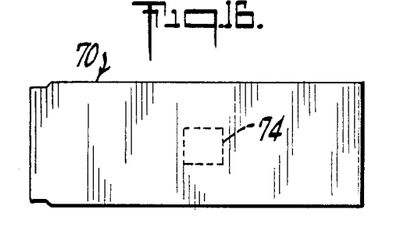
FIG. 16 is a top plan view of a plug suitable for use in a modified embodiment of the invention.
Figure 17:
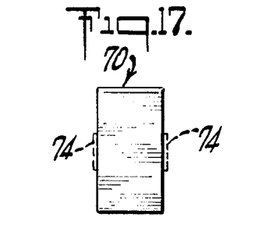
FIG. 17 is an end elevational view of the plug of FIG. 16.
Figure 18:
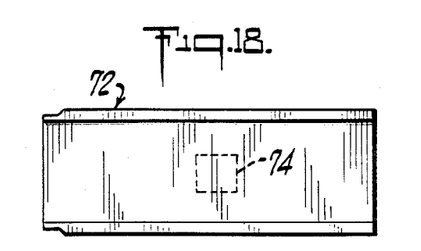
FIG. 18 is a top plan view of a further plug suitable for use in a modified embodiment of the invention.
Figure 19:
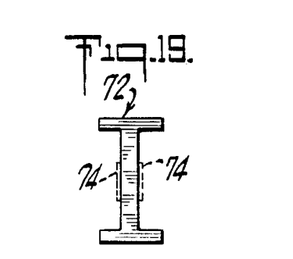
FIG. 19 is an end elevational view of the plug of FIG. 18.

In addition, the pin bore and plug may have noncylindrical (e.g. square, rectangular, etc.) cross-sectional configurations which allow an interference fit between the plug outer surface and the pin bore outer surface. For example, a plug 70 of rectangular cross section (FIGS. 16 and 17), or a plug 72 of I-shaped cross section (FIGS. 18 and 19) would be appropriate for insertion in an appropriately dimensioned bore of rectangular or square cross section. The locations of the strain gage elements are indicated at 74 in FIGS. 16-19. It is to be understood that in the case of the plug 70, the bore in which it is received has a transverse dimension (in the direction perpendicular to the strain-gageelement-bearing surfaces of the plug) sufficient to accommodate the strain gage elements with clearance as the plug is inserted in the bore.

Figure 21:
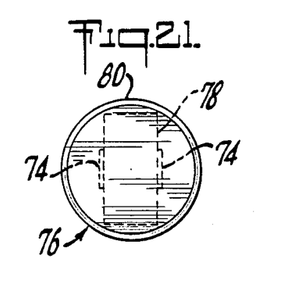
FIG. 21 is an end elevational view of the plug of FIG. 20.

A still further plug configuration, suitable for insertion in a cylindrical bore, is shown in FIGS. 20 and 21. In this plug, designated 76, an initially cylindrical plug body is machined to provide a central portion 78 of rectangular cross section, leaving opposed short cylindrical end portions 80 which are knurled with axially extending grooves to provide an interference fit with the bore in which the plug is inserted. Again, the locations of the strain gage elements are indicated by numeral 74.

As a still further alternative to the embodiments shown, a plug dimensioned to have an interference fit with an axial bore of a pin may be provided with one or more transverse apertures, and the strain gage elements may be bonded to the inner wall or walls of such aperture or apertures, rather than being bounded on surfaces parallel to the plug axis, so long as the strain gage elements are aligned with the strains which they are to measurse.

Figure 22:
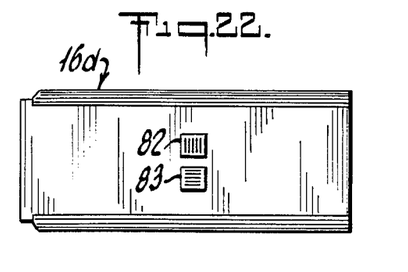
FIG. 22 is a top plan view of a plug similar to that of FIGS. 3-5 but bearing strain gage elements oriented to sense tension and compression strain.
Figure 23:
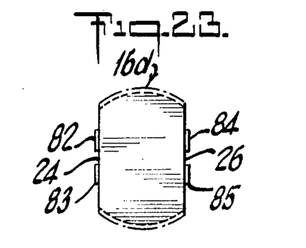
FIG. 23 is an end elevational view of the plug of FIG. 22.
Figure 24:
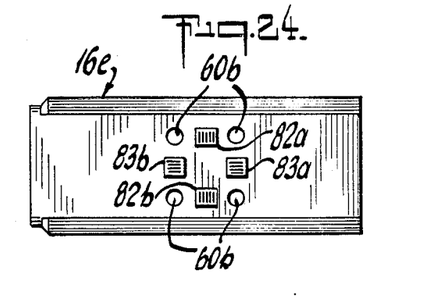
FIG. 24 is a top plan view of another plug having strain gage elements oriented to sense tension and compression strain.
Figure 25:
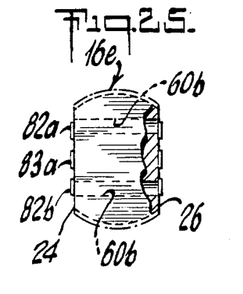
FIG. 25 is an end elevational view, partly broken away, of the plug of FIG. 24.

Similarly, apparatus in accordance with the invention may be arranged for measurement of strains other than shear strains, e.g. strains produced by tension or compression. A plug 16d arranged for insertion in the bore 14 of the pin 12 of FIG. 1, to measure tension and compression strains, is shown in FIGS. 22 and 23. The body of this plug 16d may be identical to that of the plug 16 of FIGS. 1-9, but in place of the strain gage elements 18, 19, 20 and 21 there are provided strain gage elements 82, 83, 84 and 85 having their wires oriented (as indicated) to measure strain resulting from tension or compression. If desired, as shown in FIGS. 24 and 25, a plug 16e having four strain gage elements (e.g. 82a, 82b, 83a, 83b, etc.) on each of its two flat side surfaces 24 and 26 and with appropriately located strain-amplifying transverse bores 60b may be employed for the same purpose, the strain gage elements again having their wires oriented to sense strain produced by tension and/or compression.

Figure 26:
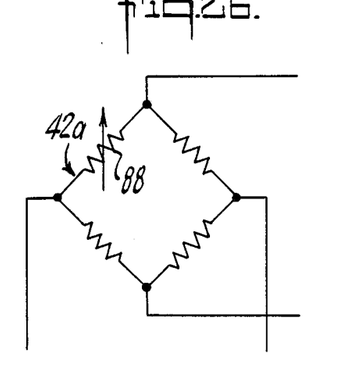
FIGS. 26 and 27 are diagrams of further bridge circuits in which the strain gage elements of embodiments of the invention may be connected.
Figure 27:
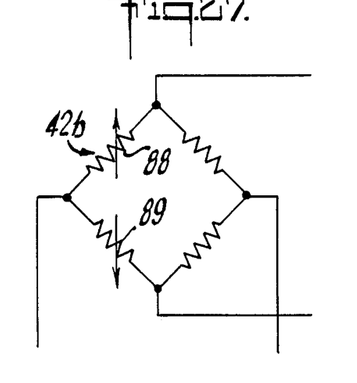

FIGS. 26 and 27 illustrate alternative Wheatstone bridge circuits 42a and 42b in which the strain gage elements may be connected to produce a desired voltage output indicative of the strain being measured. In these circuits, there may be incorporated a variable resistor 88 (FIG. 26) or two such variable resistors 88 and 89 (FIG. 27). Appropriate connection of strain gage elements in these circuits will be readily apparent to persons skilled in the art.

Figure 28:
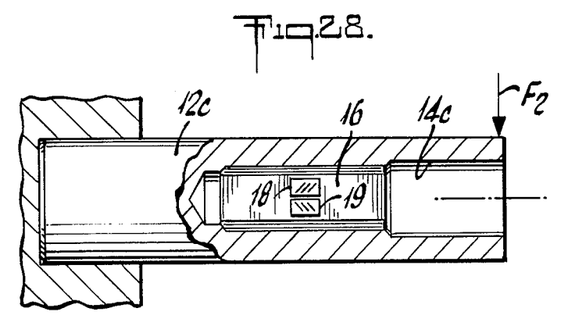
FIGS. 28 and 29 are somewhat simplified and schematic fragmentary plan views, partly in section, of embodiments of the invention respectively measuring bending strain and torsion strain.
Figures 28, 29:
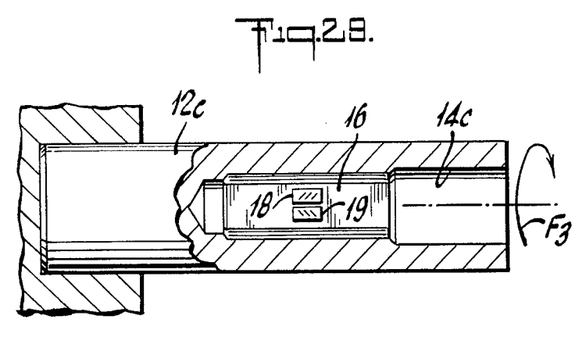

FIGS. 28 and 29 are schematic illustrations showing arrangements of the apparatus of the invention for measuring bending or torsion strain. In FIG. 28, a cantilevered pin 12c is shown as subjected to a bending force F2; strain resulting from such bending is sensed by strain gage elements 18, 19, etc., bonded to flat side surfaces of a plug 16 which is inserted endwise with an interference fit into an axial bore 14c of the pin 12c. For this purpose, the orientation of the strain gage wires relative to the geometry of the pin is the same as in FIG. 1. The same arrangement of pin 12c with the contained plug 16 will also measure strain resulting from a torsional force F3 as illustrated in FIG. 29.

It is to be understood that the invention is not limited to the features and embodiments hereinabove specifically set forth but may be carried out in other ways without departure from its spirit.

We claim:
1. Apparatus for measuring strain in a structure, including, in combination,
 (a) a pin adapted to constitute an element of the structure and to be subjected to the strain to be measured, said pin having a generally cylindrical axial bore opening through one end of the pin;
 (b) at least two strain gage elements; and
 (c) a plug for mounting said strain gage elements within the bore, said plug being inserted endwise into the bore with an interference fit and having two opposed parallel flat side surfaces, on which said strain gage elements are mounted, each of said flat side surfaces having at least one of said strain gage elements mounted thereon, and both of said flat side surfaces being shaped and disposed to enable said strain gage elements to enter the bore with clearance when the plug is introduced into the bore, said plug having the shape of a cylinder with opposite side portions cut away to provide said flat side surfaces such that there are opposed arcuate side surface portions between said flat side surfaces, and the maximum diameter of said plug between said opposed arcuate side surface portions before insertion of the plug in the bore being greater than that of the bore in the region of the bore at which the plug is disposed after insertion, each of said arcuate side surface portions being formed with multiple longitudinal grooves to enable insertion of the plug in the bore with an interference fit as aforesaid.

2. Apparatus for measuring strain in a structure, including, in combination,
(a) a pin adapted to constitute an element of the structure and to be subjected to the strain to be measured, said pin having a generally cylindrical axial bore opening through one end of the pin;
(b) at least two strain gage elements; and
(c) a plug for mounting said strain gage elements within the bore, said plug being inserted endwise into the bore with an interference fit and having two opposed parallel flat side surfaces, on which said strain gage elements are mounted, each of said flat side surfaces having at least one of said strain gage elements mounted thereon, and both of said flat side surfaces being shaped and disposed to enable said strain gage elements to enter the bore with clearance when the plug is introduced into the bore, said plug having opposed longitudinally grooved cylindrical end portions dimensioned for interference fit with said bore and a central portion of rectangular cross section extending between said end portions.

3. Apparatus as defined in claim 1 or 2, including at least four strain gage elements, two of which are mounted on each of said two side surfaces.

4. Apparatus as defined in claim 1 or 2, wherein said plug is formed with an axial through bore.

5. Apparatus as defined in claim 1 or 2, wherein said plug is formed with at least one transverse bore extending between said flat side surfaces.

6. Apparatus as defined in claim 5, including four strain gage elements mounted on each of said flat side surfaces and four of said transverse bores.

7. Apparatus as defined in claim 1 or 2, wherein said structure includes at least one element other than said pin, said one other element having a hole into which said pin is axially insertable, and wherein said apparatus further includes means engageable with said pin and said one other element for establishing and maintaining a predetermined angular orientation therebetween.

8. Apparatus as defined in claim 1 or 2, wherein said strain gage element or elements is or are oriented on said plug, and said plug is positioned within said bore, for sensing shear strain applied to said pin.

9. Apparatus as defined in claim 1 or 2, wherein said strain gage element or elements is or are oriented on said plug, and said plug is positioned within said bore, for sensing tension and compression strain applied to said pin.

10. Apparatus as defined in claim 1 or 2, wherein said structure is a tongue-and-clevis coupling, said pin pivotally interconnecting the tongue and clevis of the coupling, and wherein said strain gage element or elements is or are oriented on said plug, and said plug is positioned in said bore, for sensing shear strain on said pin resulting from drag forces acting through said coupling.

11. Apparatus as defined in claim 10, wherein said bore extends from end to end of the pin and further including a second plug for mounting one or more strain gage elements within the bore, said second plug being inserted endwise into the bore with an interference fit from the end of the bore opposite to that at which the first-mentioned plug is inserted.

* * * * *